United States Patent
Maidl et al.

(10) Patent No.: US 9,215,070 B2
(45) Date of Patent: Dec. 15, 2015

(54) METHOD FOR THE CRYPTOGRAPHIC PROTECTION OF AN APPLICATION

(75) Inventors: Monika Maidl, München (DE); Stefan Seltzsam, Ismaning (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 236 days.

(21) Appl. No.: 13/811,417

(22) PCT Filed: Jun. 22, 2011

(86) PCT No.: PCT/EP2011/060487
§ 371 (c)(1),
(2), (4) Date: Jan. 22, 2013

(87) PCT Pub. No.: WO2012/010380
PCT Pub. Date: Jan. 26, 2012

(65) Prior Publication Data
US 2013/0124860 A1    May 16, 2013

(30) Foreign Application Priority Data
Jul. 19, 2010 (DE) .......................... 10 2010 027 586

(51) Int. Cl.
*H04L 29/06* (2006.01)
*H04L 9/32* (2006.01)
(Continued)

(52) U.S. Cl.
CPC ............... *H04L 9/32* (2013.01); *G06F 21/6263* (2013.01); *H04L 9/08* (2013.01); *H04L 9/0827* (2013.01);
(Continued)

(58) Field of Classification Search
CPC ............. H04L 9/32; H04L 9/08; H04L 9/861; H04L 9/877; H04L 9/3234; H04L 9/3247; H04L 63/08; H04L 63/61; H04L 9/0827; H04L 63/123; G06F 21/6263; G06F 2221/2107; G06F 2221/2153

USPC ............... 713/164, 168, 171; 726/4; 380/259, 380/178, 183
See application file for complete search history.

(56) References Cited

U.S. PATENT DOCUMENTS

| | | | |
|---|---|---|---|
| 6,789,195 B1 | 9/2004 | Prihoda et al. | ................. 713/182 |
| 8,522,014 B2* | 8/2013 | Fedronic et al. | ............... 713/164 |

(Continued)

FOREIGN PATENT DOCUMENTS

| | | | | |
|---|---|---|---|---|
| CN | 101399665 A | 4/2009 | ............. | H04L 29/06 |
| DE | 19925910 A1 | 2/2001 | ................ | G06F 1/00 |

(Continued)

OTHER PUBLICATIONS

International Search Report and Written Opinion, Application No. PCT/EP2011/060487, 17 pages, Oct. 24, 2011.
(Continued)

*Primary Examiner* — Sarah Su
(74) *Attorney, Agent, or Firm* — Slayden Grubert Beard PLLC

(57) ABSTRACT

A method is provided for cryptographic protection of an application associated with an application owner and executed in an external data processing center having a security module that stores private cryptographic material of the application owner. A first secure channel between the security module and application owner and a second secure channel between the application owner and the application are used for transmitting a cryptographic key. The cryptographic key is automatically made available to the secure module and the application via the secure channels, without the data processing center service operator being able to access said key. The application can authenticate itself using the key so that the cryptographic material can be transmitted to the application via a channel protected by the cryptographic key. The application data can be encrypted using the cryptographic material such that the application data cannot be accessed by the data processing center service operator.

14 Claims, 1 Drawing Sheet

(51) Int. Cl.
*G06F 21/62* (2013.01)
*H04L 9/08* (2006.01)

(52) U.S. Cl.
CPC ............ *H04L 9/0877* (2013.01); *H04L 9/3234* (2013.01); *H04L 9/3247* (2013.01); *H04L 63/061* (2013.01); *H04L 63/08* (2013.01); *H04L 63/123* (2013.01); *G06F 2221/2107* (2013.01); *G06F 2221/2153* (2013.01)

(56) References Cited

U.S. PATENT DOCUMENTS

| | | | |
|---|---|---|---|
| 2003/0177401 A1* | 9/2003 | Arnold et al. | 713/202 |
| 2004/0250066 A1 | 12/2004 | Di Luoffo et al. | 713/168 |
| 2005/0120214 A1* | 6/2005 | Yeates et al. | 713/171 |
| 2005/0138374 A1 | 6/2005 | Zheng et al. | 713/166 |
| 2006/0285693 A1* | 12/2006 | Raikar | 380/278 |
| 2006/0294580 A1* | 12/2006 | Yeh | 726/3 |
| 2007/0033406 A1* | 2/2007 | Hanaki et al. | 713/171 |
| 2007/0156605 A1* | 7/2007 | Bleumer et al. | 705/64 |
| 2008/0065550 A1* | 3/2008 | Zhu et al. | 705/51 |
| 2008/0137869 A1* | 6/2008 | Robert | 380/278 |
| 2010/0058068 A1 | 3/2010 | Perkins et al. | 713/184 |
| 2010/0131764 A1* | 5/2010 | Goh | 713/171 |
| 2011/0085667 A1* | 4/2011 | Berrios et al. | 380/282 |
| 2011/0138454 A1* | 6/2011 | Mansour | 726/9 |
| 2011/0277027 A1* | 11/2011 | Hayton et al. | 726/8 |
| 2012/0129452 A1* | 5/2012 | Koh et al. | 455/41.1 |
| 2012/0179909 A1* | 7/2012 | Sagi et al. | 713/167 |
| 2012/0204032 A1* | 8/2012 | Wilkins et al. | 713/170 |
| 2013/0067216 A1* | 3/2013 | Tanner et al. | 713/155 |
| 2013/0124860 A1 | 5/2013 | Maidl et al. | 713/164 |
| 2014/0031024 A1* | 1/2014 | Xie et al. | 455/418 |
| 2014/0281483 A1* | 9/2014 | Vigliaturo et al. | 713/153 |

FOREIGN PATENT DOCUMENTS

| | | | | |
|---|---|---|---|---|
| WO | 2005/119606 A1 | 12/2005 | | G07F 7/10 |
| WO | 2012/010380 A1 | 1/2012 | | H04L 9/08 |

OTHER PUBLICATIONS

Chinese Office Action, Application No. 201180035364.8, 11 pages, Oct. 30, 2014.

* cited by examiner

METHOD FOR THE CRYPTOGRAPHIC PROTECTION OF AN APPLICATION

CROSS-REFERENCE TO RELATED APPLICATIONS

This application is a U.S. National Stage Application of International Application No. PCT/EP2011/060487 filed Jun. 22, 2011, which designates the United States of America, and claims priority to DE Patent Application No. 10 2010 027 586.7 filed Jul. 19, 2010 The contents of which are hereby incorporated by reference in their entirety.

TECHNICAL FIELD

The disclosure relates to a method and a system for the cryptographic protection of an application.

BACKGROUND

It is known that within the context of the concept known as "cloud computing" computing power is made available by a service provider to third parties which utilize said computing power for executing applications. In this scenario the applications run on a data processing center of the service provider which can either be concentrated at one location or else be interconnected in a distributed arrangement in order to provide flexible services.

It is in the interest of a customer of the service provider in the form of an application owner who wants to arrange for an application belonging to it to run on the data processing center of the service provider to ensure that the service provider has no possibility of being able to access the application and/or application data generated by the application. Protection measures must therefore be taken in order to shield off system administrators on the service provider side from the application. An example of said shielding measure is to encrypt critical data which the application stores on appropriate storage media, in particular on hard disks, of the data processing center of the service provider. By this means an unnoticed access by system administrators of the data processing center to data of the application can be prevented. One problem in this case is the secure safekeeping of the cryptographic keys used for the encryption.

Security modules, in particular in the form of hardware security modules, are known. These enable secret keys to be stored in a secure environment, in particular in the form of a smartcard or a security token, with access to the stored keys being made possible only by way of an authentication. An identification number known as a PIN is typically used for authentication purposes, whereby the owner of the security module is required to enter said PIN in order to gain access to the data stored thereon. When a security module for storing cryptographic keys for the purpose of encrypting application data is used in the course of exporting an application to a data processing center of an external service provider, it proves disadvantageous that in the case of a conventional authentication by way of a PIN said PIN must be entered manually every time the security module is accessed.

SUMMARY

In one embodiment, a method is provided for the cryptographic protection of an application, wherein the application is associated with an application owner and is executed in a data processing center which is administered by an external service provider not belonging to the application owner, wherein a security module of the application owner is provided in the data processing center, on which security module private cryptographic material of the application owner is stored, wherein: a cryptographic secret is generated by a generation means of the application owner or by the security module; the cryptographic secret is transmitted between a computer means of the application owner and the security module via a first secure channel which protects the communication between the application and the computer means, as a result of which the cryptographic secret is made accessible to the computer means and the security module; the cryptographic secret is transmitted from the computer means of the application owner to the application via a second secure channel which protects the communication between the application and the computer means, as a result of which the cryptographic secret is made accessible to the application; and an authentication of the application to the security module is carried out based on the cryptographic secret that is accessible to the application and the security module, wherein following successful authentication the cryptographic material of the application owner can be transmitted from the security module to the application via a channel protected by the cryptographic secret.

In a further embodiment, the authentication of the application is accomplished in such a way that information is encrypted by the application using the cryptographic secret that is accessible to the application and is transmitted to the security module, a condition for a successful authentication being that the security module can decrypt the information using the cryptographic secret that is accessible to the security module. In a further embodiment, a session identity is generated which is transmitted in addition at the time of the transmission of the cryptographic secret via the first secure channel and/or via the second secure channel and/or as part of the authentication of the application, it being verified in the course of the method whether the session identity remains unchanged. In a further embodiment, the session identity is the information which is encrypted by the application during its authentication and transmitted to the security module.

In a further embodiment, the cryptographic secret is generated by the security module and transmitted to the computer means of the application owner via the first secure channel, the first secure channel being formed in that a first message is encrypted by means of a first encryption to which the service provider has no access and is then transmitted to the computer means of the application owner, the first message containing the cryptographic secret. In a further embodiment, the encrypted first message is signed with a signature of the security module. In a further embodiment, the first encryption is carried out using a public key of the application owner or using a private key which is known only to the application owner and to the security module. In a further embodiment, the encrypted first message transmitted to the computer means of the application owner is decrypted and subsequently transmitted to the application via the second secure channel, the second secure channel being formed in that the decrypted first message is encrypted by means of a second encryption to which the service provider has no access and is then sent to the application.

In a further embodiment, the cryptographic secret is generated by the generation means of the application owner and transmitted to the security module via the first secure channel, the first secure channel being formed in that a second message is encrypted by means of a second encryption to which the service provider has no access and is then sent to the security module, the second message containing the cryptographic secret. In a further embodiment, the encrypted second message is signed with a signature of the application owner. In a further embodiment, the second encryption of the second message is carried out using a public key of the security module or using a private key which is known only to the application owner and to the security module. In a further embodiment, the first secure channel is tunneled by way of the application. In a further embodiment, the first secure channel is formed in that the encrypted second message is transmitted to the application initially via the second secure channel together with at least the cryptographic secret, the application thereupon transmitting the received encrypted second message to the security module.

In another embodiment, a system is provided for the cryptographic protection of an application, wherein the application is associated with an application owner and can be executed in a data processing center which is administered by an external service provider not belonging to the application owner, wherein the system includes a security module of the application owner, which security module is provided in the data processing center and on which private cryptographic material of the application owner is stored, as well as a generation means and a computer means of the application owner, wherein the system is embodied in such a way that it performs the following steps when the application is executed in the data processing center: a cryptographic secret is generated by the generation means of the application owner or by the security module; the cryptographic secret is transmitted between a computer means of the application owner and the security module via a first secure channel which protects the communication between the application and the computer means, as a result of which the cryptographic secret is made accessible to the computer means and the security module; the cryptographic secret is transmitted from the computer means of the application owner to the application via a second secure channel which protects the communication between the application and the computer means, as a result of which the cryptographic secret is made accessible to the application; and an authentication of the application to the security module is carried out based on the cryptographic secret which is accessible to the application and the security module, wherein following successful authentication the cryptographic material of the application owner can be transmitted from the security module to the application via a channel protected by the cryptographic secret.

In a further embodiment, the system is configured to perform any of the methods disclosed above.

BRIEF DESCRIPTION OF THE DRAWINGS

Exemplary embodiments are described in more detail below with reference to the attached figures, in which.

DETAILED DESCRIPTION

Figure 1:
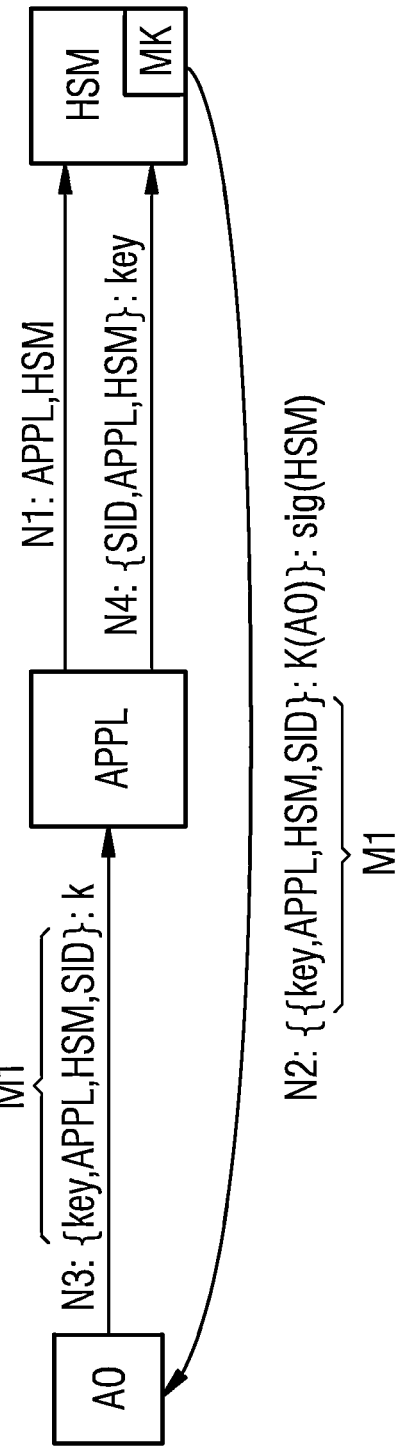
FIG. 1 is a schematic representation of the message exchange in accordance with a first example embodiment of the method.

Embodiments of the present disclosure may be configured to protect an application of an application owner in a data processing center of an external service provider against unauthorized accesses by the service provider by means of a security module, wherein automatic secure access of the application to data of the security module is made possible.

For example, in some embodiments a method may be provided for the cryptographic protection of an application which is associated with an application owner and is executed in a data processing center which is administered by an external service provider not belonging to the application owner. By application owner in this context is to be understood an organization or institution, such as e.g. an enterprise. The application belongs to said organization or institution; in particular the application was also developed by said organization or institution. The concept of the data processing center is to be understood in a broad sense within the meaning of the disclosure and can comprise one or more computers concentrated at a fixed location or distributed over various locations, computing power for executing computational operations being provided by way of said computers. The management of the data processing center is in turn undertaken by an organization or institution (in particular an enterprise) which represents the service provider. Since the service provider operates the data processing center, it also has administrator access rights to the data processing center.

Within the scope of the disclosed method a security module is used which, although belonging to the application owner, is nonetheless provided in the data processing center, i.e. it is connected via a corresponding (local) interface (e.g. USB) to a computer of the data processing center. Private (permanent) cryptographic material (e.g. private keys) of the application owner is stored on said security module and is used for suitably encrypting application data of the application. In this case the security module is implemented in particular as a hardware security module, which is known in the art.

In some embodiments, a cryptographic secret is generated by a generation means of the application owner or by the security module. The concept of the generation means is to be understood in a broad sense in this context and can include any entity realized on the basis of software and/or hardware in a secure computing environment of the application owner. The cryptographic secret is initially transmitted between a computer means of the application owner and the security module via a first secure channel which protects the communication between the application and the computer means, as a result of which the cryptographic secret is made accessible to the computer means and the security module. Such a first secure channel can be achieved for example by means of a corresponding encryption using a public key of the security module, as will be described in more detail further below. Analogously to the generation means the above-cited computer means is an arbitrary entity in the form of hardware and/or software in a secure computer environment of the application owner. Said entity can communicate with the application via a corresponding interface.

The cryptographic secret may additionally be transmitted from the computer means of the application owner to the application via a second secure channel which protects the communication between the application and the computer means, thereby making the cryptographic secret accessible to the application. It is assumed as a prerequisite in this case that a second secure channel can be set up between application owner and application. Such a second secure channel can be realized without difficulty because the application belongs to the application owner, such that e.g. a shared private key can be generated by application and application owner in a suitable manner in order to set up the second secure channel.

An authentication of the application to the security module may be finally carried out based on the cryptographic secret which is accessible to the application and the security module, wherein in the event of a successful authentication the cryptographic material of the application owner can be transmitted from the security module to the application via a channel that is protected by the cryptographic secret.

In some embodiments, access by an application running on a data processing center to cryptographic material of the application owner may be made possible in an automated manner, without the service provider of the data processing center having the possibility of reading out the cryptographic material. This is achieved through the use of a security module of the application owner, wherein a cryptographic secret is transmitted via secure channels with the application owner acting as intermediary, such that said secret is provided both to the application and to the security module. This secret can then be used for the purpose of transmitting cryptographic material of the security module to the application.

In one embodiment of the method the application is authenticated to the security module in such a way that information is encrypted by the application and transmitted to the security module together with the cryptographic secret that is accessible to the application, a condition for a successful authentication being that the security module can decrypt the information using the cryptographic secret that is accessible to the security module. By this means a verification is performed in a particularly simple manner to the effect that both the application and the security module contain the same cryptographic secret.

In another embodiment, a session identity is generated, in particular at the start of the method, and is transmitted in addition at the time of the transmission of the cryptographic secret via the first secure channel and/or via the second secure channel and/or within the framework of the authentication of the application to the security module. In this case it is verified in the course of the method whether the session identity remains unchanged. This can be accomplished for example in that the entity which generated the session identity at the start of the method (e.g. the application or the security module) checks whether the session identity transmitted to it at a later time tallies with the originally generated session identity. If this is not the case, the method may be aborted. According to this embodiment a protection is achieved against so-called replay attacks, in which an attempt is made to insinuate secrets used in earlier sessions into the method. In one variant the session identity is furthermore used as the information which is encrypted by the application during its authentication and transmitted to the security module.

In a further embodiment, the cryptographic secret is generated by the security module and transmitted via the first secure channel to the computer means of the application owner, the first secure channel being formed in that a first message is encrypted using a first encryption to which the service provider has no access and is subsequently transmitted to the computer means of the application owner, the first message containing the cryptographic secret. In this case the encrypted first message may be signed with a signature of the security module so that it can be verified that the first message also originates from the security module. In one variant the first encryption is performed using a public key of the application owner or where applicable also using a private key which is known only to the application owner or to the security module.

In a further embodiment, the encrypted first message transmitted to the computer means of the application owner is decrypted, with the decryption being carried out by the computer means. The first message is then transmitted to the application via the second secure channel, the second secure channel being formed in that the decrypted first message is encrypted by means of a second encryption to which the service provider has no access and is sent to the application. In this way the cryptographic secret is transmitted to the application over a protected connection, the application possessing a corresponding key for decrypting the second encryption.

In a further embodiment, the cryptographic secret is generated by the generation means of the application owner and transmitted via the first secure channel to the security module, the first secure channel being formed in that a second message is encrypted by means of a second encryption to which the service provider has no access and is subsequently transmitted to the security module, the second message containing the cryptographic secret. In this case the encrypted second message may be signed with a signature of the application owner. Furthermore the second encryption of the second message may be performed using a public key of the security module or where appropriate also using a private key which is known only to the application owner and to the security module.

In a further embodiment, the first secure channel is tunneled by way of the application. In other words, a message is transmitted within the scope of the first secure channel with the application acting as intermediary, although the application does not have the possibility of accessing said first secure channel or the information transmitted therein. In one variant the tunneled first secure channel is formed in that the encrypted second message is transmitted to the application initially via the second secure channel together with at least the cryptographic secret, the application then transmitting the received encrypted second message to the security module. In this way a parallel transmission is achieved both via the first and via the second secure channel.

Other embodiments provide a system for the cryptographic protection of an application, wherein the application is associated with an application owner and can be executed in a data processing center which is administered by an external service provider not belonging to the application owner, the system comprising a security module of the application owner which is provided in the data processing center and on which private cryptographic material of the application owner is stored, as well as a generation means and a computer means of the application owner. In this case the system is embodied in such a way that it performs the above-described embodiment or the method or one or more variants of said method when the application is executed in the data processing center.

The various embodiments described below relate to the cryptographic protection of an application APPL which belongs to an application owner, indicated in FIG. 1 and FIG. 2 by the reference sign AO. In this case the application owner represents an organization or institution, such as e.g. an enterprise, to which the application APPL belongs. For example, the application APPL may have been developed by the application owner. The application owner provides its customers with a corresponding service by way of the application, although it does not execute the application for providing the service itself, but makes use for this purpose of a data processing center on which the application runs. The data processing center is therefore an external entity which is administered by a service provider not belonging to the application owner AO. For this reason it is necessary to protect the application APPL or corresponding application data in a suitable way against an unauthorized access by the service provider. For this purpose a private key in the form of a master key MK is used, by means of which data generated by the application is suitably encrypted in the corresponding storage medium in the data processing center (e.g. on a hard disk in the data processing center). In the process it must be ensured that even though the application has access to the master key MK, the latter is cryptographically protected against access by the service provider.

In the embodiment discussed below, a hardware security module HSM, which is known in the art, is used to provide the master key MK, said security module belonging to the application owner and representing a cryptographically secure environment in which the master key MK is stored. The hardware security module HSM is provided in the data processing center, i.e. it is connected to a corresponding computer in the data processing center in a suitable manner via a wireless or wired interface, wherein the cryptographic protection of the hardware security module ensures that the service provider administering the data processing center has no possibility of accessing the data stored thereon.

An object of the disclosed method may be to provide automated access to the master key MK under the control of the application owner AO such that the application APPL receives the master key for encrypting data without the service provider of the data processing center having a possibility of accessing the master key. In order to achieve this, a secure authentication of the application APPL to the hardware security module HSM is performed, wherein the authentication is also protected against attackers having administrator rights in the data processing center. A basic condition here is that the authentication of the application at the hardware security module shall take place automatically, i.e. without human intervention. It is ensured by means of said basic condition that the application can restart instantly and automatically following a system crash.

By the application owner AO is to be understood in the following an appropriately secure computer environment which is associated with the application owner. In other words, when the following steps are performed by the application owner or communication with the application owner takes place, this means that a corresponding computer means, realized on the basis of software and/or hardware, which is part of the secure computer environment is involved in the method step or the communication. It is further assumed hereinbelow that during live operation of the application there is a secure channel between the application owner AO and the application APPL via which the application owner AO can exchange messages with the application APPL so that no third party, not even a system administrator of the data processing center, can read said messages. Such a secure channel, which corresponds to the second secure channel within the meaning of the claims, can be realized without difficulty between application owner AO and application APPL, since the application belongs to the application owner and accordingly is known to the latter. Consequently, a corresponding secret, known only to the application owner and to the application, can be generated in a suitable manner during the execution of the application in the data processing center and is then used in order to set up the secure channel between application owner and application.

Two example variants of the method are described below with reference to FIG. 1 and FIG. 2, wherein corresponding messages N1, N2, N3 and N4 are exchanged within the scope of the methods. In the figures the notation {N}:k denotes an encryption or signature of a message N enclosed in the brackets using a corresponding key k or a corresponding signature k, respectively. The following designations are also used within the context of FIG. 1 and FIG. 2:

sig (HSM): signature of the hardware security module HSM, with a corresponding private key of HSM;
sig (AO): signature of the application owner AO, with a corresponding private key of AO;
K (AO): public key of the application owner AO;
K (HSM): public key of the hardware security module HSM;
k: key for encrypting the communication between application owner AO and application APPL;
key: shared secret between application APPL and hardware security module HSM which is generated and exchanged within the scope of the embodiments described below;
SID: session identification which is generated at the start of the method.

Insofar as the reference signs APPL and HSM are used within the exchanged messages, they denote unique identifiers of the application or of the hardware security module, e.g. a hash code of the application or a serial number of the hardware security module.

Within the scope of the embodiment variant of FIG. 1, a message exchange is initialized by the application APPL by way of a message N1 which is sent by the application APPL to the hardware security module HSM and contains the identifier of the application APPL and of the hardware security module HSM. The hardware security module thereupon generates a symmetric key "key" which at the end of the method represents the shared secret between application and hardware security module. Said symmetric key is sent via a first secure channel based on the message N2 from the hardware security module HSM to the application owner AO. The message N2 contains a message M1 which contains the key "key", the identifiers of the application APPL and of the security module HSM, and a session identification SID. Said session identification was generated by the HSM. In this case the message M1 is encrypted using the public key K(AO) of the application owner and is also signed with the signature sig(HSM) of the hardware security module. On the basis of said message M2 it is ensured that the generated key "key" cannot be read by the system administrators of the data processing center, for these have no access to the private key of the application owner for decrypting the message M1. Because the message M2 is signed with sig(HSM), the application owner AO can be certain that the message and therefore also the key "key" originate from the security module HSM.

Following reception of the message N2 the application owner AO sends a message N3 to the application via the secure channel established between application owner AO and application APPL. In this case the message N3 contains the message M1 which was transmitted previously as part of the message N2 and is now encrypted using the corresponding key k which protects the communication between AO and APPL. By means of the secure channel between the application owner AO and the application APPL it is ensured that only the application APPL can read out the key "key" from the message N3.

In a next step, the authentication of the application APPL to the security module HSM finally takes place, the authentication being based on the message N4 which contains the identifiers of the application APPL and of the security module HSM as well as the session identification SID and is encrypted using the key "key" originally generated in the HSM. In this case the authentication will only be successful if the HSM can decrypt the message using the key originally generated by it. A further security feature is realized in that in addition the transmitted session identification SID must tally with the session identification originally generated by the HSM. This guarantees protection against replay attacks, in which messages already transmitted once in the course of an earlier authentication are reused.

Should it be possible to decrypt the message N4 using the key "key" of the HSM and if in addition the session identification SID matches the original session identification, the authentication is successful. The hardware security module HSM can now be certain that messages which it receives from the application APPL and which are encrypted by means of the key "key" actually originate from the application. According to the variant of FIG. 1 it is achieved in this case that the secret "key" reaches the application APPL via trusted connections with the application owner AO acting as intermediary, without a system administrator of the data processing center having the possibility of accessing the secret.

Following successful authentication, a secure channel can be set up between the application APPL and the security module HSM with the aid of the key "key". The master key MK is then transmitted via said channel to the application APPL, which can then encrypt application data using said key.

Figure 2:
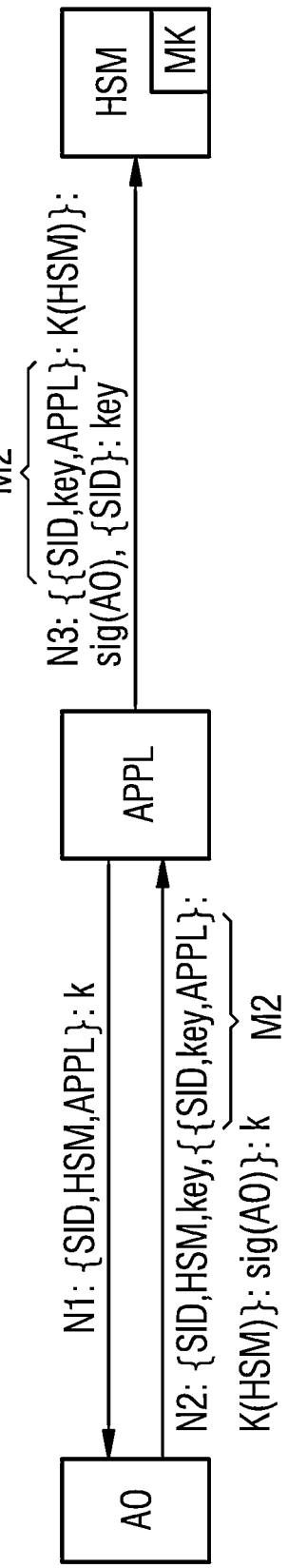
FIG. 2 is a schematic representation of the message exchange in accordance with a second example embodiment of the method.

FIG. 2 shows a second example variant of the method. In this variant, in contrast to the embodiment variant of FIG. 1, the shared secret in the form of the key "key" is generated, not by the hardware security module HSM, but by the application owner AO. In a first step, a secure message N1 is initially sent to the application owner AO by the application APPL which wants to authenticate itself to the hardware security module HSM. This message, encrypted using the key k, contains a session identification SID, which is now generated by the application APPL, as well as identifiers of the hardware security module HSM and the application APPL.

Following reception of the message N1 the application owner AO generates the symmetric key "key". Said key represents the shared secret which at the end of the method authenticates the application APPL to the security module HSM. In order to achieve said authentication the key "key" must be transmitted securely to the application APPL and the security module HSM. This is accomplished within the context of FIG. 2 by the transmission of the message N2 from the application owner AO to the application APPL, as well as of the message N3 from the application APPL to the security module HSM. In contrast to FIG. 1, no separate secure channel is set up between application owner AO and security module HSM in this case. Rather, a secure channel is tunneled between application owner AO and security module HSM by way of the application APPL.

As part of the just mentioned message N2, a message M2 is transmitted together with the generated key "key", the session identification SID and the identifier of the hardware security module HSM. In this case the message M2 again contains the session identification SID and the key "key" as well as the identifier of the application APPL. The message is in this case encrypted using the public key K(HSM) of the security module and in addition is signed with the signature sig(AO) of the application owner. The combination of encrypted and signed message M2 with SID, HSM and "key" is transmitted to the application APPL via the secure channel between AO and APPL. APPL thereupon decrypts the message and accordingly obtains the key "key", which is held in the working memory. Based on the session identification SID contained in the message, the application is able to verify that the message is up-to-date, because it can compare the transmitted session identification with the session identification originally generated by it.

Next, the application APPL sends a message N3 to the security module HSM, said message including the message M2 which was contained in the previously received message N2 and which is signed with sig(AO) and encrypted using the public key of the security module HSM, such that it could not be decrypted by the application. In addition the application APPL encrypts the session identification using the key "key" and attaches the result to the message N3.

Following reception of the message N3 the security module HSM is able to verify by way of the signature sig(AO) that the application owner AO generated said message and also transmitted the key "key" securely to the application APPL. The HSM can subsequently decrypt the encrypted session identification using the key "key" stored in it, which proves that APPL is in possession of the shared secret "key". As a result of the successful decryption the application APPL is then authenticated to the security module HSM, i.e. the security module HSM can be certain that the message encrypted using the key "key" comes from APPL. By comparing the session identification SID in the message N3 with the session identification encrypted by means of "key" the security module HSM can furthermore establish that the message N3 is not a replay of an old message. Following the authentication a secure channel can then be set up between the application APPL and the security module HSM using the shared secret in the form of the key "key", whereupon the master key MK can then be transmitted from the HSM to the application APPL so that the application can subsequently encrypt the application data using said master key.

The embodiments described above may provide a number of advantages. For example, a secure authentication of the application APPL to the security module HSM of the application owner AO is made possible without the external service provider on whose data processing center the application runs having the possibility of accessing the shared secret between application and security module which was generated during the authentication process. This is achieved through the use of a security module associated with the application owner as well as by means of a communication via secure channels with the application owner acting as intermediary. At the same time the master key of the security module can be accessed automatically, without the need for a password to be input manually by authorized persons of the application owner.

What is claimed is:

1. A method for the cryptographic protection of an application that is associated with an application owner and which is executed in a data processing center administered by an external service provider not belonging to the application owner, wherein the application owner is an entity that developed or otherwise owns the application, wherein the external service provider is an entity distinct from the application owner and provides non-owners of the application, which comprise entities distinct from the application owner and the external service provider, access to use the application, wherein the data processing center provides a security module of the application owner that stores private cryptographic material of the application owner, and wherein the method comprises:

generating a cryptographic secret by a generation application of the application owner or by the security module;

transmitting the cryptographic secret between a computer of the application owner and the security module via an encrypted transmission via a first secure channel between the application and the computer of the application owner, the encrypted transmission being decryptable by the application and the computer of the application owner, but not by the external service provider or the non-owners of the application, as a result of which encrypted transmission the cryptographic secret is made accessible to the computer of the application owner and the security module but not to the external service provider or the non-owners of the application;

transmitting the cryptographic secret from the computer of the application owner to the application via a second secure channel between the application and the computer of the application owner, as a result of which the cryptographic secret is made accessible to the application, but remains inaccessible to the external service provider and the non-owners of the application; and performing an authentication of the application to the security module based on the cryptographic secret that is accessible to the application and the security module, wherein following successful authentication the cryptographic material of the application owner is transmittable from the security module to the application via a channel protected by the cryptographic secret.

2. The method of claim 1, wherein the authentication of the application is performed such that information is encrypted by the application using the cryptographic secret that is accessible to the application and is transmitted to the security module, wherein the authentication requires that the security module can decrypt the information using the cryptographic secret that is accessible to the security module.

3. The method of claim 2, wherein the session identity is the information which is encrypted by the application during its authentication and transmitted to the security module.

4. The method of claim 1, wherein a session identity is generated which is transmitted in addition at the time of the transmission of the cryptographic secret via at least one of the first and second secure channels or as part of the authentication of the application, and wherein it is verified whether the session identity remains unchanged.

5. The method of claim 1, wherein the cryptographic secret is generated by the security module and transmitted to the computer of the application owner via the first secure channel, the first secure channel being formed in that a first message is encrypted by a first encryption to which the service provider has no access and is then transmitted to the computer of the application owner, the first message containing the cryptographic secret.

6. The method of claim 5, wherein the encrypted first message is signed with a signature of the security module.

7. The method of claim 5, wherein the first encryption is carried out using a public key of the application owner or using a private key which is known only to the application owner and to the security module.

8. The method of claim 5, wherein the encrypted first message transmitted to the computer of the application owner is decrypted and subsequently transmitted to the application via the second secure channel, the second secure channel being formed in that the decrypted first message is encrypted by a second encryption to which the service provider has no access and is then sent to the application.

9. The method of claim 1, wherein the cryptographic secret is generated by the generation application of the application owner and transmitted to the security module via the first secure channel, the first secure channel being formed in that a second message is encrypted by a second encryption to which the service provider has no access and is then sent to the security module, the second message containing the cryptographic secret.

10. The method of claim 9, wherein the encrypted second message is signed with a signature of the application owner.

11. The method of claim 9, wherein the second encryption of the second message is carried out using a public key of the security module or using a private key which is known only to the application owner and to the security module.

12. The method of claim 1, wherein the first secure channel is tunneled by way of the application.

13. The method of claim 1,
wherein the cryptographic secret is generated by the generation application of the application owner and transmitted to the security module via the first secure channel, the first secure channel being formed in that a second message is encrypted by a second encryption to which the service provider has no access and is then sent to the security module, the second message containing the cryptographic secret;
wherein the first secure channel is tunneled by way of the application; and
wherein the first secure channel is formed in that the encrypted second message is transmitted to the application initially via the second secure channel together with at least the cryptographic secret, the application thereupon transmitting the received encrypted second message to the security module.

14. A system for the cryptographic protection of an application that is associated with an application owner and which is executable in a data processing center administered by an external service provider not belonging to the application owner,
wherein the application owner is an entity that developed or otherwise owns the application,
wherein the external service provider is an entity distinct from the application owner and provides non-owners of the application, which comprise entities distinct from the application owner and the external service provider, access to use the application,
the system comprising:
a security module of the application owner provided in the data processing center and which stores private cryptographic material of the application owner, and
a computer of the application owner,
wherein the system is configured to perform the following steps upon execution of the application at the data processing center:
generating a cryptographic secret by the application owner;
transmitting the cryptographic secret between the computer of the application owner and the security module via an encrypted transmission via a first secure channel between the application and the computer of the application owner, the encrypted transmission being decryptable by the application and the computer of the application owner, but not by the external service provider or the non-owners of the application, as a result of which encrypted transmission the cryptographic secret is made accessible to the computer of the application owner and the security module but not to the external service provider or the non-owners of the application;
transmitting the cryptographic secret from the computer of the application owner to the application via a second secure channel between the application and the computer of the application owner, as a result of which the cryptographic secret is made accessible to the application, but remains inaccessible to the external service provider and the non-owners of the application; and performing an authentication of the application to the security module based on the cryptographic secret which is accessible to the application and the security module, wherein following successful authentication the cryptographic material of the application owner is transmittable from the security module to the application via a channel protected by the cryptographic secret.

* * * * *